United States Patent [19]

Rossmann

[11] 3,889,283
[45] June 10, 1975

[54] PHOTOGRAPHIC DIAPHRAGM CONTROL MEANS

[75] Inventor: Dieter Rossmann, Aalen, Germany

[73] Assignee: Carl Zeiss Stiftung, Oberkochen, Germany

[22] Filed: Mar. 8, 1974

[21] Appl. No.: 449,399

[30] Foreign Application Priority Data
Mar. 14, 1973 Germany............................ 7309629

[52] U.S. Cl. ................ 354/272; 354/232; 354/234; 354/235; 354/271
[51] Int. Cl. ............................................. G03b 9/02
[58] Field of Search ........... 354/232, 234, 235, 266, 354/269, 271, 272

[56] References Cited
UNITED STATES PATENTS
2,861,506  11/1958  Leder et al. ......................... 354/272

*Primary Examiner*—Samuel S. Matthews
*Assistant Examiner*—Russell E. Adams, Jr.
*Attorney, Agent, or Firm*—Stonebraker, Shepard & Stephens

[57] ABSTRACT

Electromagnetic control means for shifting a photographic diaphragm from a fully open position used for viewing the scene to be photographed, to a predetermined aperture position used when taking the picture. A single electromagnet, when momentarily energized, shifts the diaphragm from one position to the other. It stays in the position to which it is shifted, until the electromagnet is again energized momentarily, whereupon it is shifted back to the second position. The circuit of the electromagnet is momentarily energized by momentarily closing a switch, either by actuating the camera release plunger, or by the swinging motion of the reflex mirror of the camera.

6 Claims, 9 Drawing Figures

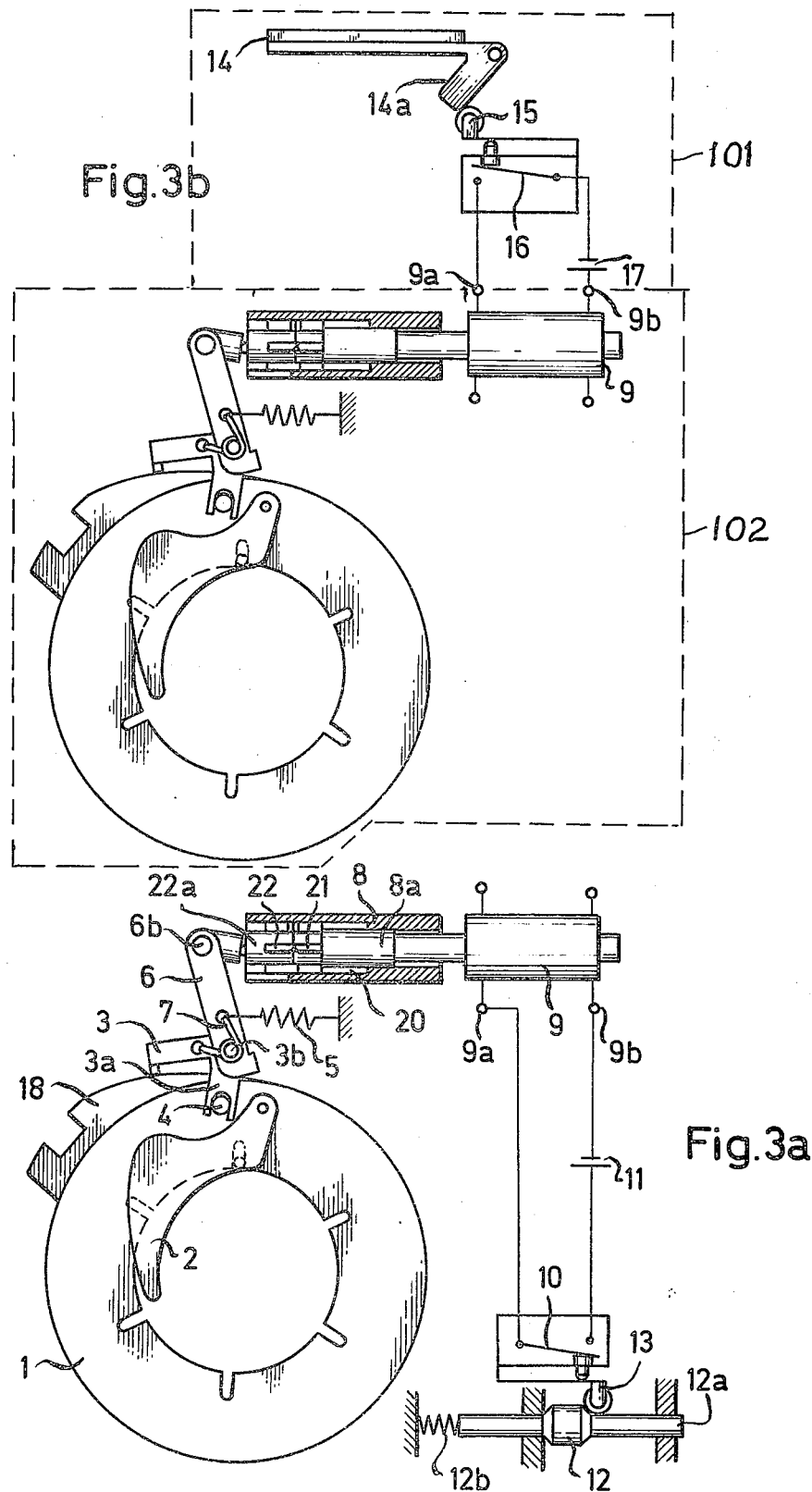

PHOTOGRAPHIC DIAPHRAGM CONTROL MEANS

BACKGROUND OF THE INVENTION

A well known type of photographic camera is a single lens mirror reflex camera. In such cameras, when a scene is being viewed preparatory to making the actual exposure, a pivoted mirror is in viewing position, and the camera shutter (if it is an objective shutter) is open so that light comes in through the lens, is reflected by the mirror onto a viewing screen, and is observed by the photographer. If the camera has a focal plane shutter (curtain shutter) rather than an objective shutter, the shutter remains closed during the viewing operation, as it is behind the reflex mirror and does not interfere with passage of light to the mirror and thence to the viewing screen.

In either event, whether the camera has an objective shutter or a focal plane shutter, it is desirable to have the diaphragm open to its maximum aperture position, during the viewing operation, so that the maximum amount of light will reach the viewing screen and the image of the scene will be well illuminated for observation by the photographer. However, when the exposure is to be made, the diaphragm should oridinarily be closed down to a smaller aperture which is appropriate to the amount of light coming from the scene, and the speed or sensitivity of the film, and the shutter speed or exposure time. Also, the pivoted reflex mirror is to be swung up from viewing position to picture taking position before the actual exposure is made, and then swung down again from picture taking position to viewing position, after the exposure is made, so that the next scene can be viewed by the photographer. The diaphragm aperture to be used during the exposure may be preselected either by a manual adjustment, or by operation of automatic mechanism controlled by a light meter.

All of this is well understood in the art. Many mechanisms are known for closing the diaphragm down from fully open or maximum aperture position to the preselected aperture position, concomitantly with swinging the reflex mirror up from viewing position to picture taking position, and also concomitantly with closing the shutter which has been open for viewing (if it is an objective shutter), then opening the shutter to make the exposure, closing it again to terminate the exposure, then swinging the reflex mirror down from picture taking position to viewing position and concomitantly opening the diaphragm to maximum aperture position and also opening the shutter (if it is an objective shutter) so that light from the scene may strike the mirror and be reflected onto the viewing screen. The various known mechanisms for accomplishing these motions are mostly of a mechanical nature, operated by springs or the like. As distinguished from these prior constructions, the present invention relates particularly to electromagnetic means for shifting the diaphragm from fully open or maximum aperture position to the preselected aperture position, and then moving it back from the preselected aperture to fully open position.

It has been suggested to use a single electromagnet so arranged that when the magnet is not energized, the diaphragm is in its fully open position, and the diaphragm is held in its stopped down or preselected aperture as long as the electromagnet is energized. The disadvantage of this arrangement is that the flow of current through the coil of the electromagnet must be continued during the entire length of the exposure, and this involves a substantial drain on the battery, particularly when using long exposures of, say, one-half second or more. It has also been proposed to use two separate electromagnets, one of which, when momentarily energized, will shift the diaphragm from fully open position to preselected aperture, and the other of which, when energized, will shift the diaphragm from preselected aperture to fully open position. But this arrangement has the disadvantage of the added expense of providing two electromagnets instead of one, and the further disadvantage of the extra space required by the second electromagnet, which is a serious disadvantage when it is desired, for example, to build the mechanism into a small compact interchangeable lens unit.

An object of the present invention is to eliminate all of these disadvantages, and to provide a construction in which only a single electromagnet is used, and which only a momentary energization of the single magnet is required in order to shift the diaphragm in a reliable manner from one position to the other. This momentary energization can be for a very brief time, considerably less than the length of the exposure, so that the drain on the battery is very slight.

Another object of the invention is to provide simple and effective switching means for causing the momentary energization of the electromagnet automatically when the camera release member or trigger member is actuated to initiate an exposure, or when the mirror swings from viewing position to picture taking position or vice versa.

A further object is the provision of mechanism so arranged that the electromagnetic operating mechanism for the diaphragm can be placed, if desired, in an interchangeable lens unit or lens and shutter unit detachable from the camera, while the battery and the switch for controlling the supply of current from the battery to the electromagnet can be placed within the camera body.

BRIEF DESCRIPTION OF THE DRAWINGS

FIGS. 3a and 3b are views similar to FIGS. 1a and 1b, respectively, with no current flowing through the electromagnet, the diaphragm remaining in its preselected aperture position; and FIGS. 4a, 4b, and 4c are schematic views illustrating the action of the detent member associated with the electromagnet, in three different positions correspondingly respectively to the positions of parts shown in FIGS. 1a, 2a, and 3a.

DESCRIPTION OF THE PREFERRED EMBODIMENT

The general features of the camera are of conventional construction, the details of which are unimportant so far as the present invention is concerned, and are subject to wide variation. These conventional parts are not illustrated, except to the extent necessary for an understanding of the present invention.

Figure 1A:
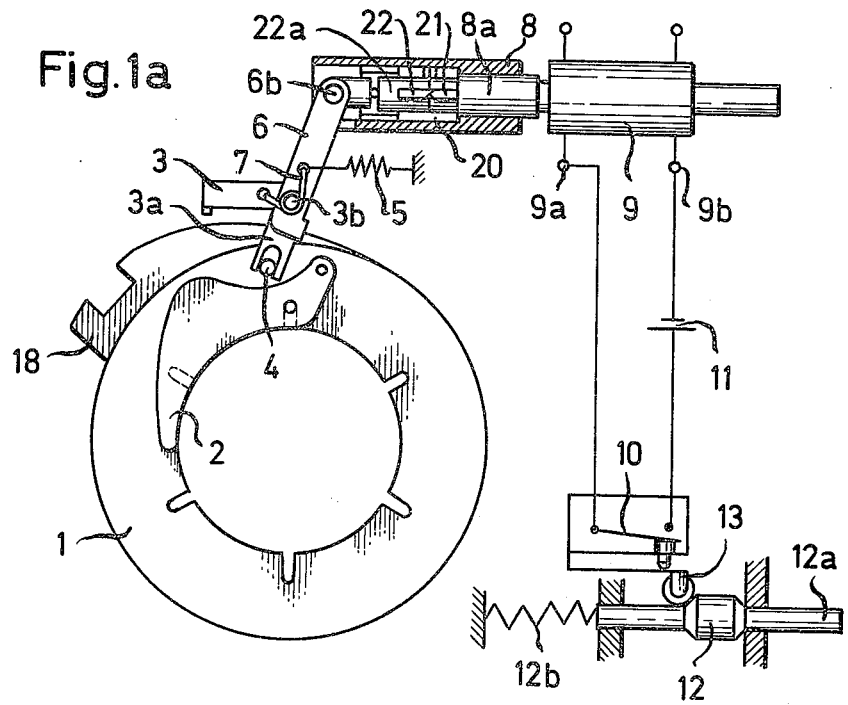
FIG. 1a is a schematic view of mechanism according to a preferred embodiment of the invention, illustrating the diaphragm in its fully open position, and with no current flowing through the electromagnet, the current being controlled by a manual switch.
Figure 1B:
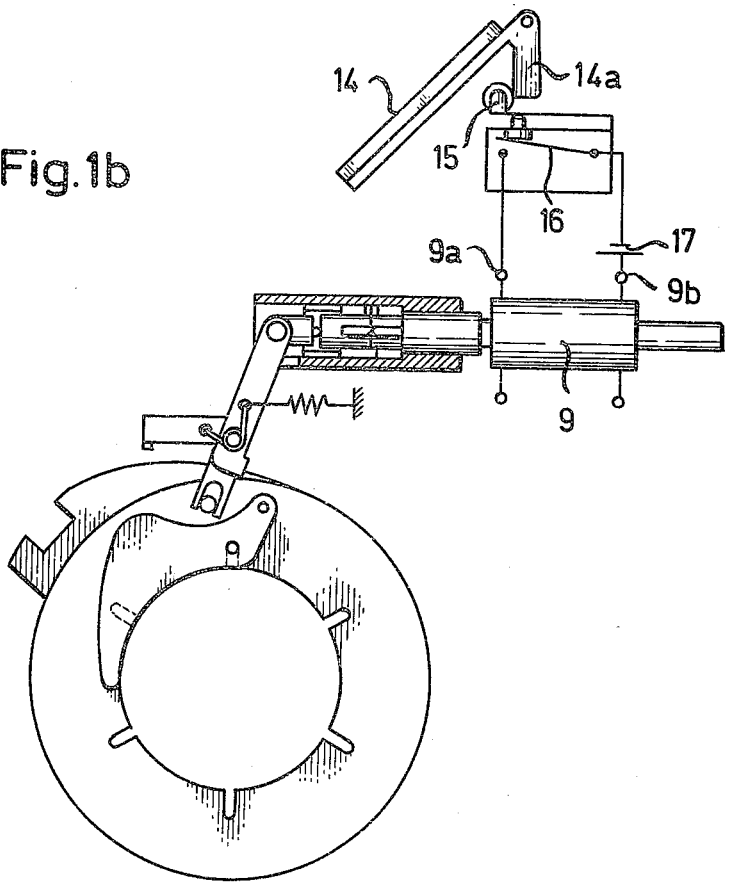
FIG. 1b is a schematic view similar to FIG. 1a, except that the flow of current through the electromagnet is controlled by a switch operated by the swinging of a reflex mirror rather than by a manual switch.

The construction includes a conventional iris diaphragm having the conventional rotary operating ring 1, rotating about the optical axis as a center, slots in the ring engaging pins on the conventional leaves of an iris diaphragm, to swing the leaves on their pivots as the ring 1 turns in one direction or the other. Any suitable number of diaphragm leaves are employed; only one is shown, for the sake of clarity. In FIGS. 1a and 1b, the diaphragm is fully open to its maximum aperture. In FIGS. 2a, 2b, 3a, and 3b, the diaphragm is stopped down to a smaller aperture at which the exposure is to be made, preselected either manually or through any suitable conventional automatic mechanism controlled by an exposure meter or the like.

For moving the diaphragm leaves, the ring 1 is turned by a bellcrank lever 3 pivoted on a stationary pivot, one arm 3a of the lever being slotted or forked to engage a pin 4 on the diaphragm operating ring 1. The other arm of the bellcrank lever has a feeler end for engaging any suitable control member for determining the size of the aperture which is to be set. This control member is conveniently in the form of a cam member 18 formed on a ring rotatable about the optical axis as a center. When the bellcrank lever 3, 3a swings counterclockwise on its pivot 3b, it turns the diaphragm operating ring 1 in a clockwise direction, moving the diaphragm leaves 2 toward closed position. The extent to which the bellcrank lever can turn counterclockwise is controlled by the position of the cam 18.

Another lever 6 pivoted to swing on the same pivot 3b on which the bellcrank lever 3 swings. A spring 5 tends to swing this lever 6 clockwise, and another spring 7 tends to swing the bellcrank lever 3 counterclockwise relative to the lever 6. A bent over ear on the lever 6 engages the lever 3 in such a way that clockwise movement of the lever 6 will carry the lever 3 with it, but the lever 6 can move counterclockwise relative to the lever 3 without carrying the lever 3 counterclockwise with it, if the feeler end of the lever 3 is already engaged with the cam 18 and so can move counterclockwise no farther.

A stationary sleeve 8 receives the plunger 8a of an electromagnetic solenoid 9, so arranged that when current flows through the coil of the solenoid, the plunger 8a is moved in a leftward direction when viewed as in the drawings. This plunger is part of an alternate stroke detent mechanism or assembly, further described below in connection with FIGS. 4a–4c. It is sufficient for the present to say that when the plunger 8a moves leftwardly, it acts through a pivot 6b at the upper end of the lever 6 to swing this lever 6 leftwardly or counterclockwise on its pivot 3b, against the force of the spring 5 which constantly tends to swing the lever 6 rightwardly or clockwise. As will be explained below, the nature of the alternate stroke detent mechanism or assembly is such that on one leftward stroke of the solenoid plunger, the detent mechanism will retain the lever 6 almost but not quite at the leftward limit of its motion, allowing it to swing back rightwardly only a short distance from the extreme leftward limit of motion. It is held in this position mechanically, without the need for any continuance of flow of current through the coil of the solenoid 9. Then on the next energization of the solenoid 9, the next leftward stroke of the plunger 8a will move the lever 6 slightly leftwardly to the limit of its motion and then (when flow of current is discontinued) the lever will be allowed (under the influence of the spring 5) to return all the way to its rightward limit of motion. Then the next movement of the plunger leftwardly will cause the lever 6, after reaching its leftward limit, to be retained almost but not quite at its leftward limit, and the next stroke of the plunger will allow it to return rightwardly to its rightward limit, and so on, alternately. Thus in each case, only a momentary flow of current through the coil of the solenoid is necessary, for producing the leftward stroke of the plunger 8a, and then the current can immediately be turned off, without further drain on the battery.

Figure 2A:
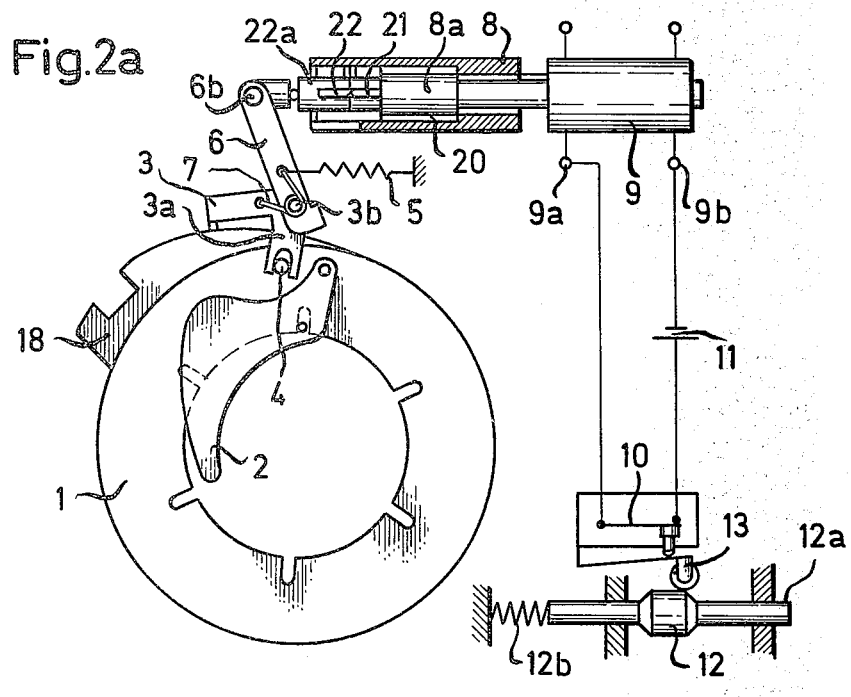
FIGS. 2a and 2b are views similar respectively to FIGS. 1a and 1b, with current flowing through the electromagnet and with the diaphragm closed down to its preselected aperture.
Figure 2B:
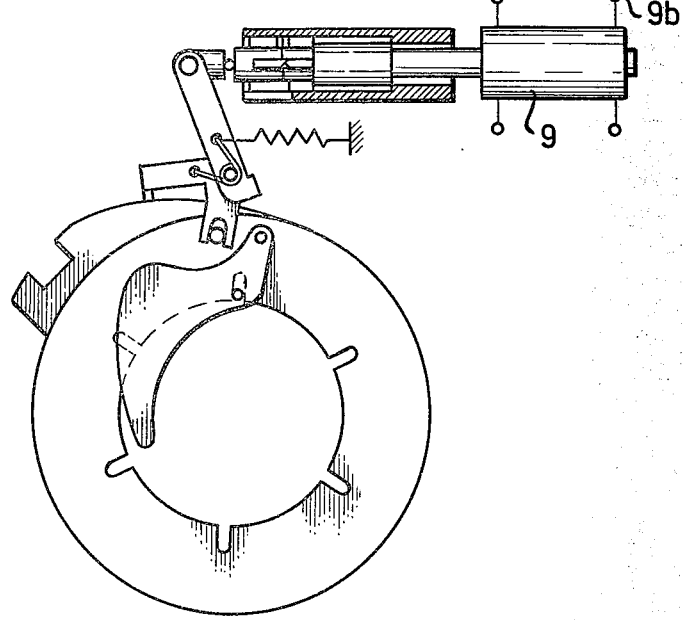

The switch mechanism for momentarily energizing the solenoid coil can be operated either manually, by the release plunger or trigger member of the camera, or automatically by the swinging of the reflex mirror between its two positions mentioned earlier. Both arrangements are shown in the drawings. FIGS. 1a, 2a, and 3a illustrate operation by the release plunger, while FIGS. 1b, 2b, and 3b illustrate operation by the swinging of the reflex mirror.

Referring first to the switch arrangement operated by the release plunger, the coil of the solenoid 9 is connected through the spring biased normally open switch 10 to a battery 11. The conventional release plunger 12a of the camera, which is moved inwardly against the force of a spring 12b in order to initiate the exposure operation in the conventional way, is provided with an intermediate enlargement 12. When the plunger is pressed inwardly to start the exposure, the enlargement 12 displaces a roller on a spring arm 13, to press this against the plunger of the switch 10, to close the switch, thereby completing the circuit and energizing the coil of the solenoid 9. As the plunger 12a is pressed inwardly from the initial position shown in FIG. 1a, the switch 10 is closed only momentarily, while the enlargement 12 is passing and acting upon the lever arm 13 as shown in FIG. 2a. When the plunger 12a reaches the inner limit of its motion as shown in FIG. 3a, the enlargement has passed the roller on the lever 13 and the switch 10 has again opened. So no matter how long the operator's finger remains on the plunger 12a and the plunger 12a remains depressed, the switch has been closed only momentarily, to give only a very short energization to the solenoid, and there is no continuing drain on the battery.

This momentary energization moves the plunger 8a leftwardly to the extreme position shown in FIG. 2a, and then as the inward motion of the plunger 12a continues to its inner position shown in FIG. 3a, the solenoid is turned off but the detent mechanism allows the lever 6a to move rightwardly only a very short distance, holding it in the position shown in FIG. 3a. In moving from the FIG. 1a position to the FIG. 2a position, the lever 6 has carried with it the bellcrank lever 3, until the feeler end of the bellcrank lever comes against the preselection cam 18, determining the extent to which this lever can close down the leaves 2 of the diaphragm. When the lever 6 backs off a trifle from the extreme position shown in FIG. 2a to the intermediate position shown in FIG. 3a, the bellcrank lever 3 is still held against the cam 18 by the force of the spring 7, so the diaphragm still stays at the preselected aperture. But after the exposure has been completed, and the operator takes his finger pressure off of the end of the plunger 12a, the spring 12b pushes the plunger out again to its normal or rest position shown in FIG. 1a, and as the plunger travels outwardly the enlargement 12 again closes the switch 10 momentarily, so that the solenoid coil is momentarily energized and once more the plunger 8a is moved momentarily to its leftward limit. This serves to move the lever 6 from the intermediate position shown in FIG. 3a to the extreme leftward position shown in FIG. 2a, and this time the detent mechanism releases the lever and allows the lever to swing all the way back to its extreme rightward position shown in FIG. 1a. During the latter part of its rightward swinging, the bent ear on the lever 6 comes into contact with the bellcrank lever 3 and moves this lever 3 clockwise to its limit position, pulling the feeler arm thereof away from the cam 18, and swinging the ring 1 counterclockwise to open the iris diaphragm leaves 2 to their maximum aperture or fully open positions shown in FIG. 1a.

With similar effect, the switching of the electric circuit for the coil of the electromagnetic solenoid 9 can be controlled by the swinging of the reflex mirror instead of by the manual plunger. This arrangement is shown in FIGS. 1b, 2b, and 3b, where the reflex mirror of the camera is illustrated schematically at 14. The mirror has a cam portion 14a which, as the mirror swings, engages a roller on a switch operating arm or lever 15, to press against and momentarily close the normally open switch 16 in the circuit connecting the battery 17 to the coil of the solenoid 9. Except for the cam arm 14a which operates the switch, the mirror and its associated mechanism are otherwise of conventional form as commonly found in pivoted reflex mirror cameras.

Both in the viewing position of the mirror, schematically shown in FIG. 1b, and in the picture taking position schematically shown in FIG. 3b, the switch 16 is open. But as the mirror 14 swings in either direction from one of these positions to the other, it momentarily closes the switch 16 as shown in FIG. 2b. This closing of the switch 16 has the same effect as the previously described closing of the switch 10. As the mirror swings up from the viewing position of FIG. 1b through the intermediate position of FIG. 2b to the picture taking position of FIG. 3b, the momentary closing of the switch will operate the plunger through one stroke to move the lever 6 to the extreme position shown in FIG. 2b, and then when the supply of current to the solenoid is discontinued after a moment, the detent mechanism will allow the lever 6 to swing back rightwardly only to its intermediate position shown in FIG. 3b, close to the extreme limit position, and the diaphragm will remain closed down to the preselected aperture. Then later, when the exposure has been completed and the mirror 14 swings back from the picture taking position of FIG. 3b through the intermediate position of FIG. 2b to the viewing position of FIG. 1b, the switch 16 will again be closed momentarily, and this will cause a leftward momentary actuation of the plunger 8a, which this time will release the detent mechanism so that the lever 6 can swing back rightwardly all the way to its rightward limit position, opening the diaphragm leaves to fully open or maximum aperture position.

It will be noted that in either case, whether the switch is operated manually by the plunger 12a, or automatically by the swinging of the mirror 14, the switch is never closed more than just for a moment at a time, and there is no continuing flow of current during the time that the exposure is in progress. This is a very important feature, as it greatly reduces the drain on the battery as compared with prior art devices where, using only a single electromagnet or solenoid, it has been necessary to keep the current flowing through the coil during the entire progress of the exposure, in order to keep the diaphragm at the preselected aperture.

If the solenoid 9, sleeve 8, lever 6, etc., are built into an interchangeable lens unit, the circuit and switch connections 10, 11 or 16, 17 are preferably built into the camera body, and are electrically connected to the electromagnet or solenoid 9 by separable connections indicated schematically at 9a and 9b. These connections are preferably formed by contact members which are automatically coupled to each other by the act of mounting the interchangeable lens on the camera, and are automatically uncoupled from each other by the act of removing the interchangeable lens from the camera. Such connections are known in the art.

Figure 4A:
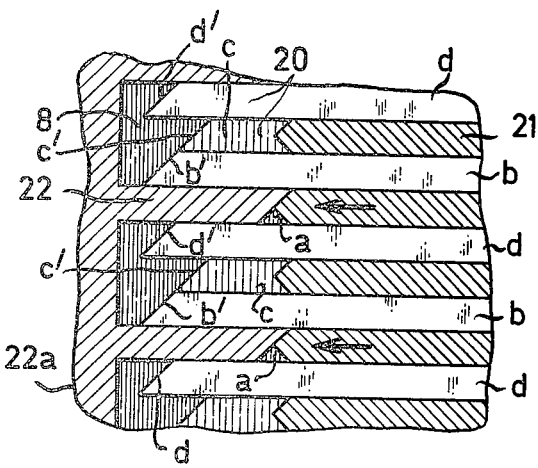
Figure 4B:
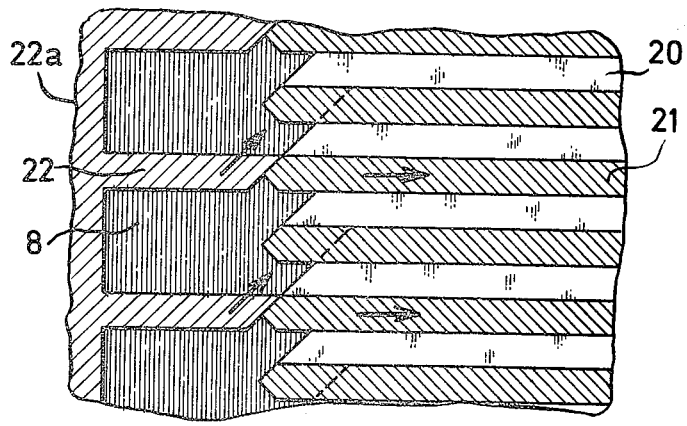
Figure 4C:
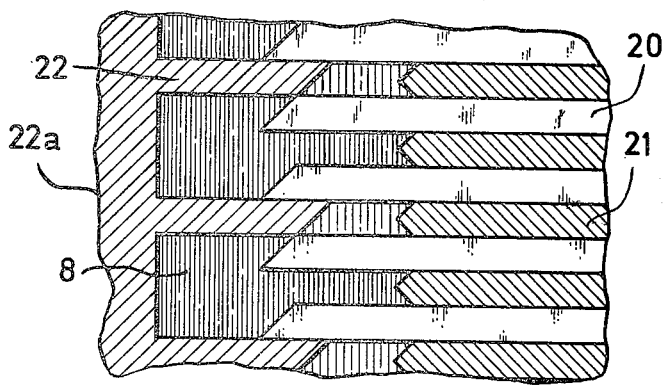

Referring now to the detent mechanism included within the sleeve 8, for holding the diaphragm in the stopped down or preselected aperture position even when no current is flowing through the electromagnet, this detent mechanism is schematically illustrated in FIGS. 4a, 4b, and 4c, and is of a type which has been used in other fields, as for example in pens and pencils. Such articles are known in which one push on a plunger in the handle will extend the writing element from the tip end of the handle and hold it in extended position. Then another push on the same plunger will cause the writing element to be retracted to a protected position within the barrel of the handle.

FIGS. 4a, 4b, and 4c represent developed views of the construction inside the barrel or sleeve 8, laid out in a flat plane. On the inner circumferential surface of the sleeve 8 there is a formation of axially extending grooves and ridges of four different kinds, here designated successively in a circumferential direction as a, b, c, and d, this series being repeated continuously around the inner circumference of the sleeve 8. Whether any particular element of this formation is regarded as a groove or as a ridge will depend on the reference plane. For convenience, the bottom surface of the element a, which is at the same elevation (same radial distance from the central axis of the sleeve) has the surface to the left of these formations 20, will be regarded as the reference plane. The elements b and d of the formation 20 are ridges rising to one height above this reference plane (that is, extending radially closer to the central axis of the sleeve) and the elements c also rise from the reference plane but to a lesser extent than the elements b and d. In other words, the surfaces c are at a greater radial distance from the central axis of the sleeve than the surfaces of the elements b and d, but at a lesser radial distance than the surfaces of the elements a. Thus in effect, the elements a may be considered as deep grooves between the last element d of the previous series of elements and the element b of the next series, while the elements c may be considered as shallower grooves between the elements b and d of the same series.

All of the elements b, c, and d have oblique left ends indicated respectively at b', c', and d', and constituting oblique shoulders. Ridges 21 extending axially on the periphery of the plunger 8a of the solenoid, slide axially in the grooves a and c of the formation 20 formed on the inner face of the sleeve 8. These ridges 21 have oblique or sloping left ends as illustrated.

The member 22a within the sleeve 8 is connected rotatably to the lever 6, as above mentioned, and has external ridges 22 of such height that they can slide longitudinally in the grooves a of the formation 20, but cannot enter the shallower slots c of that formation. The right ends of the ridges 22 are sloped obliquely in the same direction as the oblique shoulders b', c', and d' of the formation 20.

To explain the operation, assume that the diaphragm parts are in the position shown in FIGS. 1a or 1b and 4a, the spring 5 holding the lever 6 and element 22a in the right hand limit position, the diaphragm being fully open. If now the camera release plunger 12a is actuated or if the mirror 14 is swung up from viewing position to picture taking position, there will be a momentary energization of the coil of the electromagnet or solenoid 9, which will move the plunger 8a leftwardly. The leftward motion of the plunger will cause the ridges 21 on this plunger to push the ridges 22 on the member 22a leftwardly, carrying the lever 6 to its extreme leftward position shown in FIG. 2a or 2b, where the right ends of the ridges 22 arrive at the left ends of the shoulders b' of the formation 20. The reaction of the oblique ends of the ridges 21 against the oblique ends of the ridges 22 tends to turn the ridges 22 and member 22a within the sleeve 8, and it is free to turn and does turn as soon as the ends pass the shoulders b'. The plunger 8a and its ridges 21 now withdraw rightwardly since the momentary current in the coil has ceased. A light spring may be used to draw the plunger rightwardly, if desired. Since the member 22a continues to be pressed rightwardly by the spring 5, the oblique ends of the ridges 22 slide over the oblique shoulders b' and c' from the position shown in FIG. 4b to the position shown in FIG. 4c, the rotation and the rightward movement of the member 22a stopping in this position, with the ridges 22 abuting against the shoulders c'. The parts are now in the position shown in FIGS. 3a or 3b and 4c, a slight distance to the right of the leftward limit position shown in FIGS. 2a or 2b and 4b, but the diaphragm is still in its stopped down position at the preselected aperture.

Then on the next energization of the coil, as the mirror 14 swings down or as the plunger 12a is released and moves outwardly under the influence of its spring 12b, there is another leftward actuation of the plunger 8a. The ridges 21 again engage the ridges 22 and move them leftwardly from the position shown in FIG. 4c far enough so that the right ends of the ridges 22 pass the left ends of the shoulders d'. Just as before, the action of the sloping or oblique ends of the ridges engaged with each other tends to turn the member 22a within the sleeve 8, and the right ends of the ridges 22 snap past the left ends d', the member 22a turns to bring the ridges 22 into alignment with the slot a, and the spring 5 moves the lever 6 and the connected member 22a and its ridges 22 rightwardly to the extreme right hand position, the ridges 22 sliding rightwardly in the slots a until the parts reach the extreme right hand position shown in FIGS. 1 and 4a, with the diaphragm fully open to maximum aperture for viewing of the picture scene with all available light.

With this arrangement, the above mentioned objects are accomplished in a very simple and economical manner. Only a single magnet is required, and only a momentary energization of the coil of the magnet is needed, to shift the diaphragm mechanism alternately from fully open to preselected aperture condition, or from preselected aperture to fully open condition.

It has been mentioned above that the solenoid or electromagnet 9 and the parts operated by it may be mounted in an interchangeable lens unit, while the battery 11 or 17 and the switch 10 or 16 may be mounted in the camera body. This is schematically illustrated in FIG. 3b, where the camera body is schematically indicated by the dash line enclosure 101, and the interchangeable lens unit, containing the diaphragm and its operating mechanism, is schematically indicated by the dash line enclosure 102.

What is claimed is:

1. Photographic diagram control mechanism comprising an adjustable diaphragm movable between a fully open position and a preselected aperture position, spring means biasing said diaphragm toward one of said positions, an electromagnetic actuator including an electric coil and a plunger movable in one direction upon momentary flow of current through said coil, and alternate stroke detent mechanism operatively connecting said plunger to said diaphragm, said detent mechanism constituting means effective upon a first stroke of said plunger in said direction to move said diaphragm to one of its said positions against the force of said spring biasing means and to hold said diaphragm in such position notwithstanding discontinuance of flow of current through said coil, and effective upon a second stroke of said plunger in the same direction to release said diaphragm for return to the other of its said positions under the influence of said spring biasing means.

2. Mechanism as defined in claim 1, wherein said spring biasing means biases said diaphragm toward its fully open position, and said first stroke moves said diaphragm to and latches it in its preselected aperture position.

3. Mechanism as defined in claim 2, further comprising an electric switch effective when in closed position to supply electric current to said coil and effective when opened to discontinue supply of current to said coil, and operating means movable back and forth in either direction through a predetermined path of travel, for closing said switch at an intermediate point of said path of travel in either direction, said switch being open when said operating means is at either end of its path of travel.

4. Mechanism as defined in claim 3, wherein said operating means includes a camera release member movable in one direction to initiate an exposure cycle of a camera.

5. Mechanism as defined in claim 3, further including a pivoted reflex mirror swingable between a viewing position and a picture taking position, and wherein said operating means includes a switch closing arm connected to and swinging with said mirror.

6. Mechanism as defined in claim 3, further comprising a camera body, an interchangeable lens unit detachably mounted on said camera body, and a battery for furnishing current for said electric coil, said diaphragm and spring biasing means and actuator and detent mechanism all being mounted in said interchangeable lens unit, said battery and said switch and said operating means being mounted in said camera body.

* * * * *